United States Patent [19]

Jindra et al.

[11] Patent Number: 4,792,115
[45] Date of Patent: Dec. 20, 1988

[54] COUPLING WITH FUSIBLE ACTUATOR MEMBER

[75] Inventors: Paul R. Jindra, Brooklyn; Edward D. Gailey, Mentor, both of Ohio

[73] Assignee: Tuthill Corporation, Cleveland, Ohio

[21] Appl. No.: 168,690

[22] Filed: Mar. 16, 1988

[51] Int. Cl.$^4$ ............................................. F16L 37/28
[52] U.S. Cl. ................................... 251/149.6; 137/74
[58] Field of Search ............... 251/149, 149.6; 137/72, 137/74

[56] References Cited

U.S. PATENT DOCUMENTS

3,245,423  4/1966  Hansen et al. .
3,532,101  10/1970 Snyder, Jr. .
4,280,523  7/1981  Norton .
4,290,440  9/1981  Sturgis .

Primary Examiner—A. Michael Chambers
Assistant Examiner—John C. Fox
Attorney, Agent, or Firm—Tarolli, Sundheim & Covell

[57] ABSTRACT

A coupling includes plug and socket assemblies which are interconnectable to connect conduits in fluid communication. A heat fusible actuator member is connected with a valve member disposed in the socket assembly. The actuator member extends axially outwardly from the valve member and has an outer end portion which is engageable with the plug assembly to move the valve member from a closed condition to an open condition as the plug and socket assemblies are interconnected. The actuator member is fusible upon exposure to excessive heat to release the valve member for movement from the open condition to the closed condition under the influence of a biasing spring. As the valve member moves from the open condition to the closed condition, the size of the actuator member is reduced as it is compressed into a unitary body under the influence of the force applied against the valve member by the biasing spring. In one embodiment of the invention, when the actuator member is exposed to excessive heat, it is axially compressed. In another embodiment of the invention, when the actuator member is exposed to excessive heat, it is radially compressed. The actuator member could be mounted in the plug assembly if desired.

17 Claims, 6 Drawing Sheets

COUPLING WITH FUSIBLE ACTUATOR MEMBER

BACKGROUND OF THE INVENTION

This invention relates generally to a new and improved coupling which is utilized to interconnect a pair of conduits. More specifically, the invention relates to a coupling which interrupts fluid communication between the conduits upon exposure of the coupling to excessive heat.

During the use of gas appliances, such as cooking stoves and other devices, there is an ever present danger of a fire which will travel through the conduits to a source of flammable gas. In order to prevent this from happening, couplings have been provided with a safety cutoff which closes a valve to block a flow of gas to the appliance upon heating of the coupling. Known couplings which may be used in such an environment and having safety cutoff devices which respond to exposure of the coupling to excessive heat are disclosed in U.S. Pat. Nos. 3,245,423; 3,532,101; 4,280,523; and 4,290,440.

SUMMARY OF THE PRESENT INVENTION

The present invention provides a new and improved coupling for use in connecting a pair of conduits in fluid communication. The coupling includes a plug assembly which is adapted to be connected with one of the conduits and a socket assembly which is adapted to be connected with the other conduit. The plug and socket assemblies are interconnectable to connect the conduits in fluid communication with each other.

The socket assembly includes a valve member which is urged toward a closed condition by a biasing spring. A heat fusible actuator member extends axially outwardly from the valve member. The actuator member has an outer end portion which is engageable by the plug assembly to transmit force to move the valve member from the closed condition to the open condition as the plug and socket assemblies are interconnected.

Upon exposure of the coupling to excessive heat, the actuator member fuses and is compressed to release the valve member for movement to the closed condition while the plug and socket assemblies remain interconnected. Thus, upon exposure of the coupling to excessive heat, the actuator member is crushed or compressed into a unitary body to reduce its size and allow the valve member to move toward the closed condition. In one embodiment of the invention, the actuator member is axially compressed. In another embodiment of the invention, the actuator member is radially compressed. Although it is preferred to mount the valve member and actuator member in the socket assembly, it is contemplated that the valve member and/or actuator member could be mounted in the plug assembly if desired.

Accordingly, it is an object of this invention to provide a new and improved coupling wherein an actuator member is connected with and extends axially outwardly from a valve member, the actuator member being fusible upon exposure to excessive heat to release the valve member for movement from an open condition to a closed condition.

Another object of this invention is to provide a new and improved coupling wherein an actuator member moves a valve member from a closed condition to an open condition upon interconnection of plug and socket assemblies and wherein the actuator member is fusible and compressible into a relatively small unitary body upon exposure to excessive heat to release the valve member for movement from the open condition to the closed condition.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Coupling

A coupling 10 (FIG. 1), constructed in accordance with the present invention, is utilized to connect a pair of conduits (not shown) in fluid communication with each other. The coupling 10 includes a plug assembly 12 which is telescopically received in a socket assembly 14. An externally threaded metal end portion 16 of the plug assembly 12 is connected with a fluid conduit. An externally threaded metal end portion 18 of the socket assembly 14 is connected with a second fluid conduit. When the plug and socket assemblies 12 and 14 are interconnected in the manner shown in FIG. 1, the fluid conduits are connected in fluid communication with each other through the coupling 10.

Figure 1:
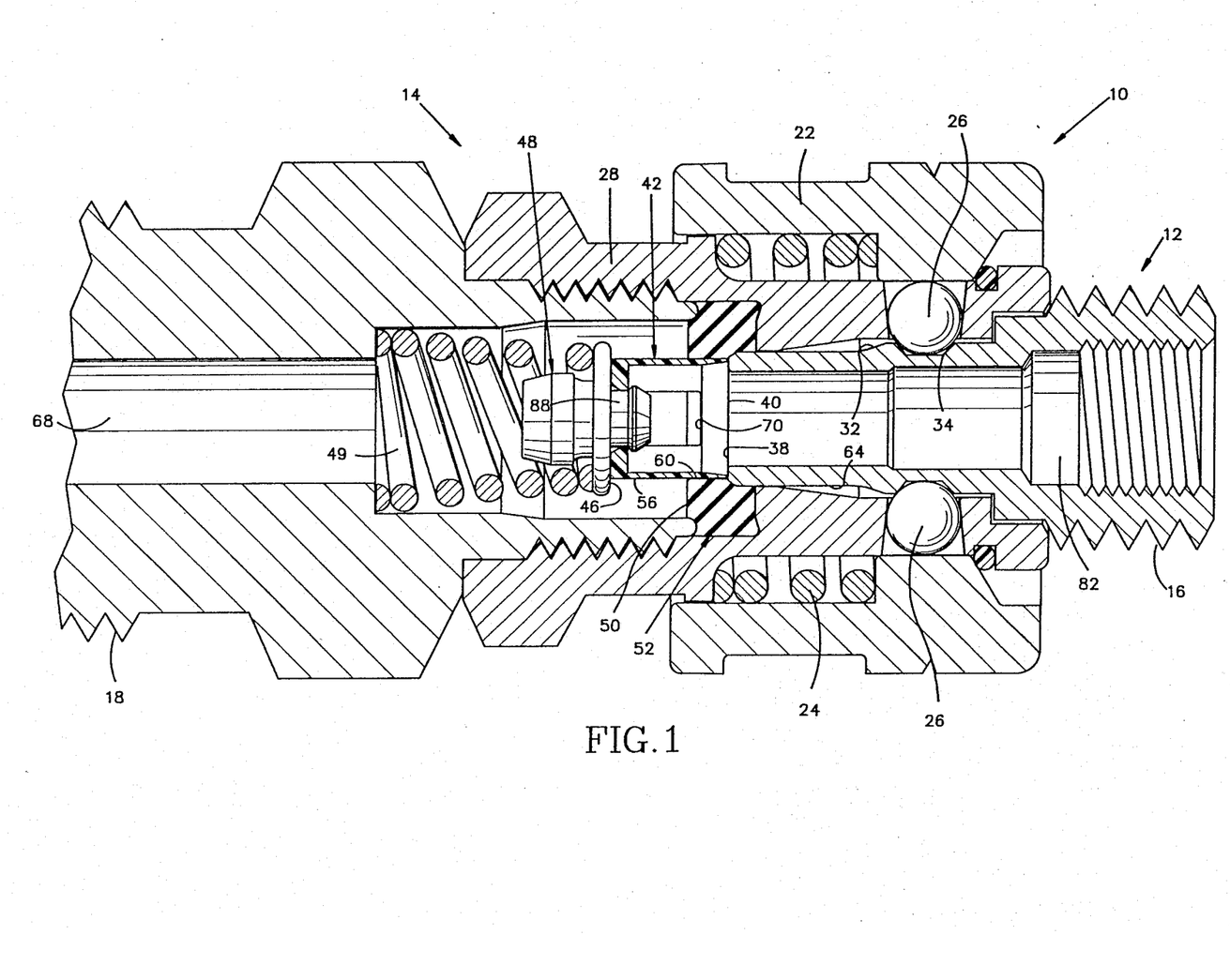
FIG. 1 is a sectional view of a coupling having plug and socket assemblies which are interconnected with a valve member in an open condition to enable fluid to flow through the coupling.

To interconnect the plug and socket assemblies 12 and 14, a cylindrical metal locking sleeve 22 is retracted, that is moved toward the left as viewed in FIG. 1, against the influence of a metal biasing spring 24. Retraction of the locking sleeve 22 releases spherical metal locking elements 26 for radially outward movement relative to a generally cylindrical metal socket body 28. After the locking sleeve 22 has been retracted to release the locking elements 26, the plug assembly 12 can be telescopically inserted into the socket assembly 14.

As the plug assembly 12 is inserted into the socket assembly 14, a circular ramp 32 on the metal plug assembly 12 engages the locking elements or balls 26 and forces them radially outwardly. Continued inward movement of the plug assembly 12 moves an annular groove 34 into radial alignment with the locking elements 26. The sleeve 22 is then released to force the locking elements 26 into the groove 34 to retain the plug assembly 12 in the socket assembly 14. Although it is preferred to use spherical locking elements or balls 26 to hold the plug assembly 12 in the socket assembly 14, it is contemplated that cylindrical pins or other known types of locking elements could be used if desired.

In addition, as the plug assembly 12 is inserted into the socket assembly 14, an annular metal end surface 38 on the plug assembly 12 abuttingly engages an annular end surface 40 on a cylindrical actuator member 42. The axially opposite end portion 44 of the actuator member 42 is pressed against and is coaxial with an annular surface 46 on a metal valve member 48 (FIG. 3). The axial force transmitted from the plug assembly 12 through the actuator member 42 to the valve member 4 moves the valve member from the closed condition of FIG. 2 to the open condition of FIGS. 1 and 3.

Figure 2:
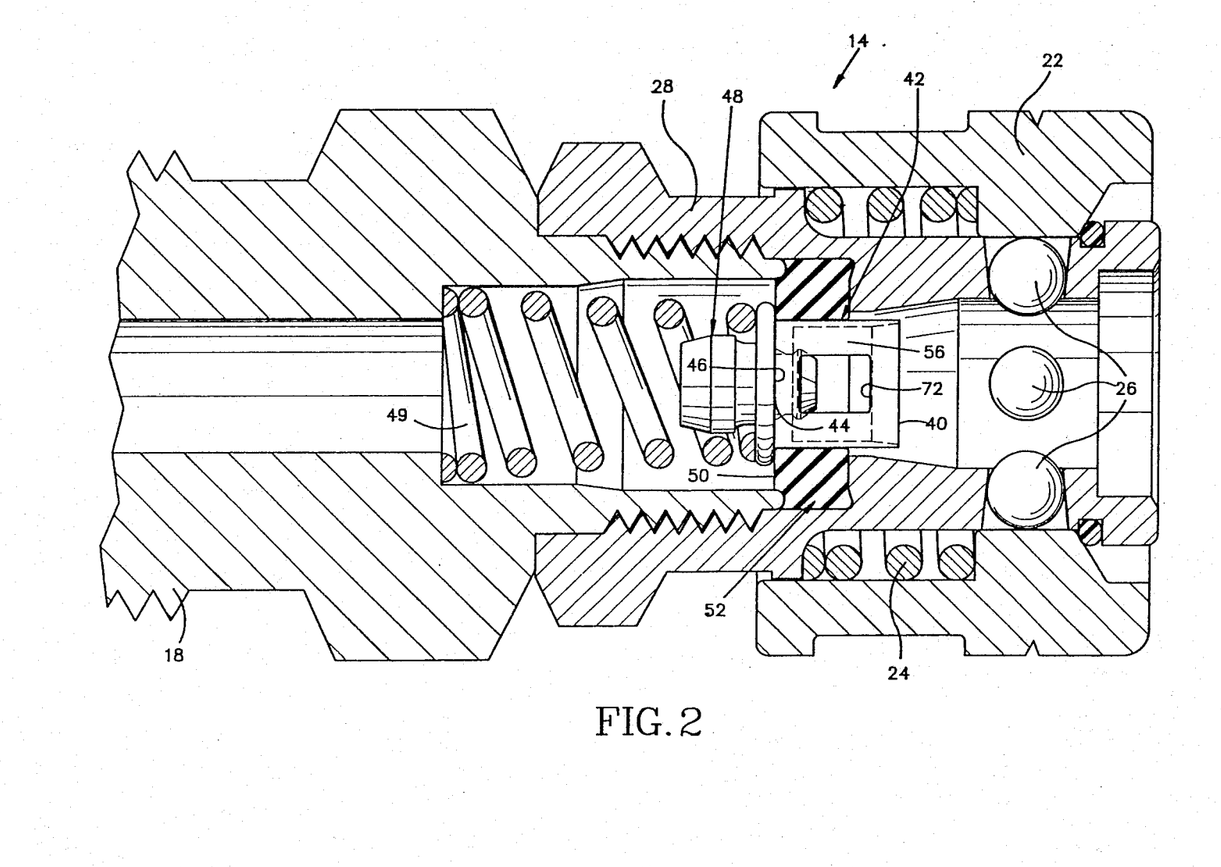
FIG. 2 is a sectional view of the socket assembly of FIG. 1, the socket assembly being disconnected from the plug assembly and the valve member being in a closed condition.
Figure 3:
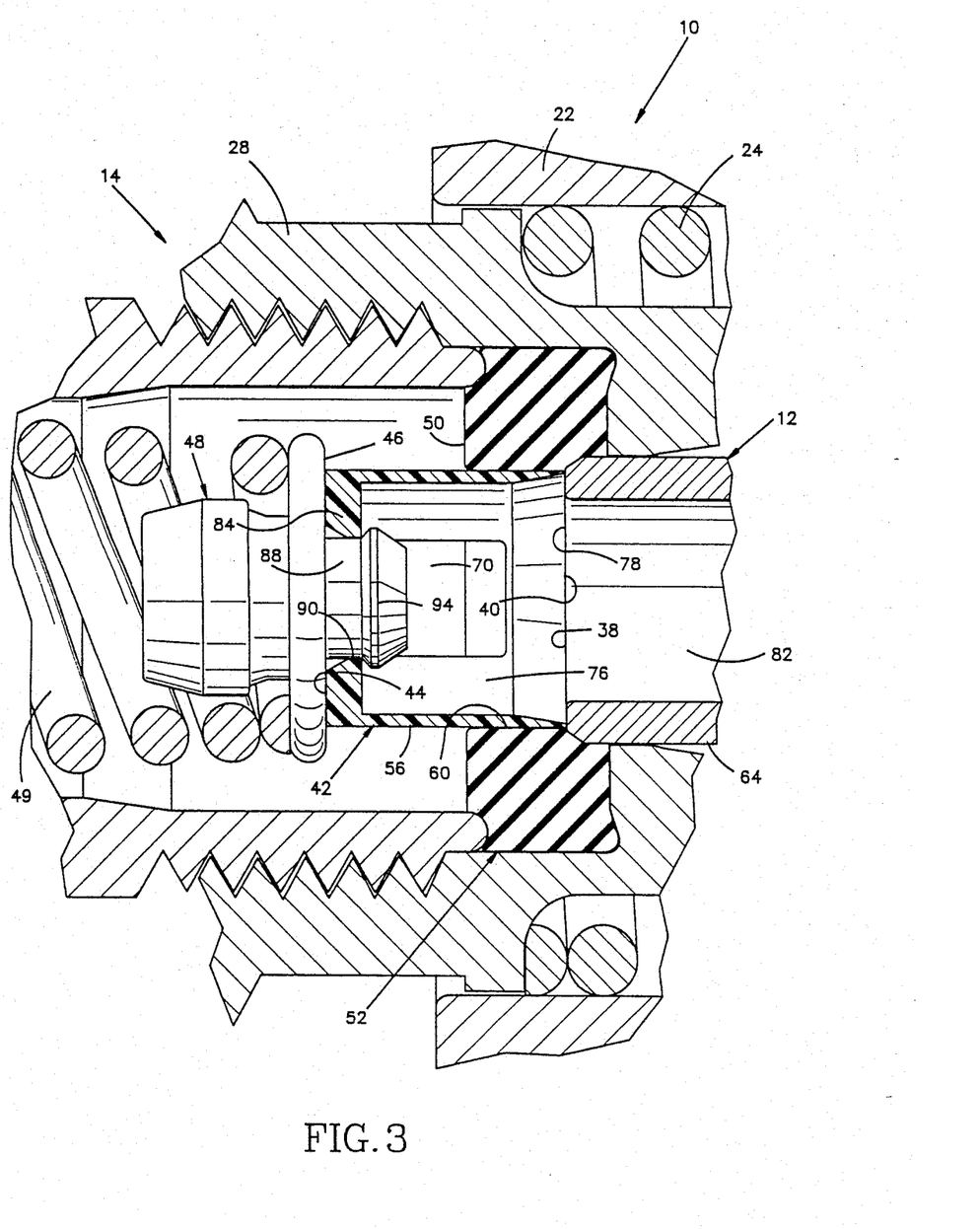
FIG. 3 is an enlarged sectional view illustrating how a heat fusible actuator member holds the valve member in the open condition when the plug and socket assemblies are interconnected as shown in FIG. 1.

The force applied against the end surface 40 of the actuator member 42 by the coaxial end surface 38 of the plug assembly 12 as it is inserted into the socket assembly 14 moves the actuator member inwardly from the initial position shown in FIG. 2 to the retracted position shown in FIGS. 1 and 3. This moves the valve member 48 from the closed condition of FIG. 2 to the open condition of FIG. 3 against the influence of a metal biasing spring 49. As the valve member 48 is moved from the closed condition of FIG. 2 to the open condition of FIG. 1, a cylindrical outer side surface 56 on the actuator member 42 (FIG. 3) slides along a cylindrical inner side surface 60 on the annular seal ring 52 to guide movement of the valve member 48. When the valve member 48 is in the closed position of FIG. 2, it is pressed against the annular radially extending side surface 50 on the seal ring 52 by the spring 49 to block fluid flow through the socket assembly 14. When the valve member 48 is in the open condition of FIG. 3, fluid can flow through the plug and socket assemblies 12 and 14.

As the plug assembly 12 is inserted into the socket assembly 14, the leading end portion of the plug assembly moves into telescopic engagement with the seal ring 52. The cylindrical outer side surface 64 on the plug assembly 12 has a slightly larger diameter than the cylindrical inner side surface 60 on the resiliently deflectable seal ring 52. Therefore, the cylindrical inner side surface 60 of the polymeric seal ring 52 tightly and sealingly engages the cylindrical outer side surface 64 on the plug assembly 12. Once the plug assembly 12 has been inserted into the socket assembly 14, the valve member 48 is held in the open condition of FIGS. 1 and 3 by force transmitted from the plug assembly through the actuator member 42 to the valve member 48.

Figure 5:
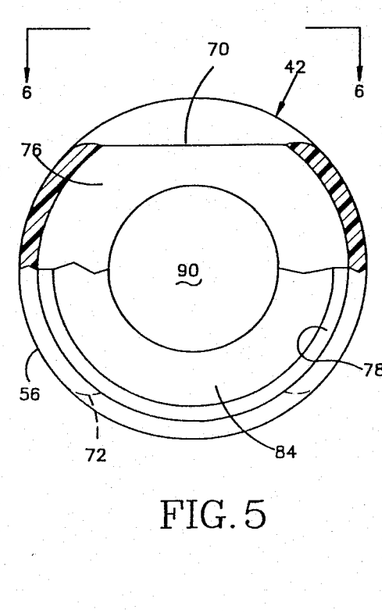
FIG. 5 is an end view, taken generally along the line 5—5 of FIG. 4, further illustrating the construction of the heat fusible actuator member.

When the plug assembly 12 is in the socket assembly 14, fluid can flow from a passage 68 (FIG. 1) in the socket assembly through a pair of rectangular side openings 70 and 72 (FIGS. 1, 3 and 5) formed in a cylindrical side wall of the actuator member 42. The fluid flows through the openings 70 and 72 into a cylindrical passage 76 inside the actuator member 42 (FIG. 3). The passage 76 has a circular opening 78 through which fluid flows from the inside of the actuator member 42 into a passage 82 (FIG. 3) in the plug assembly 12. At this time, the polymeric material of the seal ring 52 disposed in sealing engagement with the outer side surface of the actuator member 42 and the outer side surface 64 of the plug assembly 12 to prevent leakage of fluid from the coupling 10.

If desired, the fluid could flow from the plug assembly 12 to the socket assembly 14. In this situation, the valve member 48, actuator member 42 and seal ring 52 would be mounted in the plug assembly 12. The socket assembly 14 would be provided with a surface which would be engaged by the actuator member 42 as the plug and socket assemblies 12 and 14 are interconnected.

Figure 6:
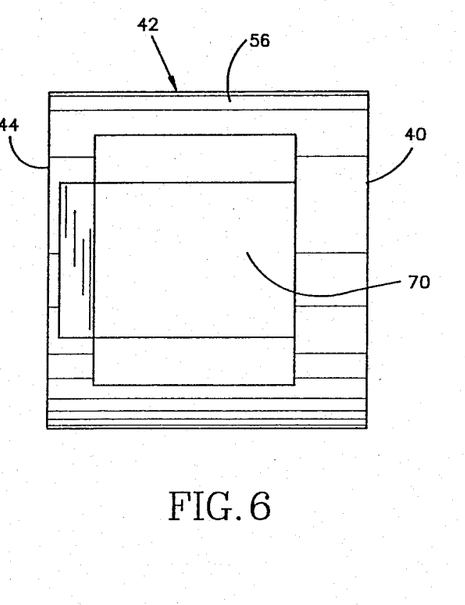
FIG. 6 is a plan view, taken generally along the line 6—6 of FIG. 5, illustrating the configuration of an opening in a side wall of the heat actuator member.

The identical rectangular openings 7 and 72 (FIGS. 4–6) in the sidewall of the cylindrical actuator member 42 are offset to one side of and extend parallel to the central axis of the actuator member 42. The circular end opening 78 (FIGS. 4, 5) has a central axis which is coincident with the central axis of the actuator member 42.

When the plug assembly 12 is to be disconnected from the socket assembly 14, the cylindrical locking sleeve 22 is retracted, that is pulled toward the left (as viewed in FIG. 1) against the influence of the biasing spring 24. This releases the locking elements 26. The force transmitted from the valve biasing spring 49 through the actuator member 42 to the plug assembly 12 then initiates movement of the plug assembly out of the socket assembly 14. As this occurs, an annular inner side surface of the groove 34 on the plug assembly 12 cams the locking elements 26 outwardly to release the plug assembly.

Once the locking elements 26 have released the plug assembly 12, the outer side surface 64 of the plug assembly 12 moves out of sealing engagement with the annular inner side surface 60 of the seal ring 52. At the same time, the cylindrical outer side surface 56 of the actuator member 42 slides outwardly, that is toward the right as viewed in FIG. 1, along the cylindrical inner side surface 60 of the annular seal ring 52. Thus, the inner side surface 00 of the seal ring 52 slidably engages the coaxial cylindrical outer side surface 56 on the actuator member 42 to guide movement of the valve member 48 from the open condition of FIG. 1 to the closed condition of FIG. 2. When the plug assembly 12 has been at least partially ejected from the socket assembly 14, the annular valve seat 46 sealingly engages the annular surface 50 on the seal ring 52 to block fluid flow through the socket assembly 14 (FIG. 2).

Fusing and Compressing of the Actuator Member

In accordance with a feature of the present invention, when the plug and socket assemblies 12 and 14 are interconnected (FIG. 1) and are exposed to excessive heat, the actuator member 42 fuses and is compressed under the influence of the valve biasing spring 49. Thus, when the actuator member 42 is exposed to excessive heat, it starts to melt or fuse and loses its rigidity. The actuator member 42 can then be compressed by the force of the spring 49.

Figure 7:
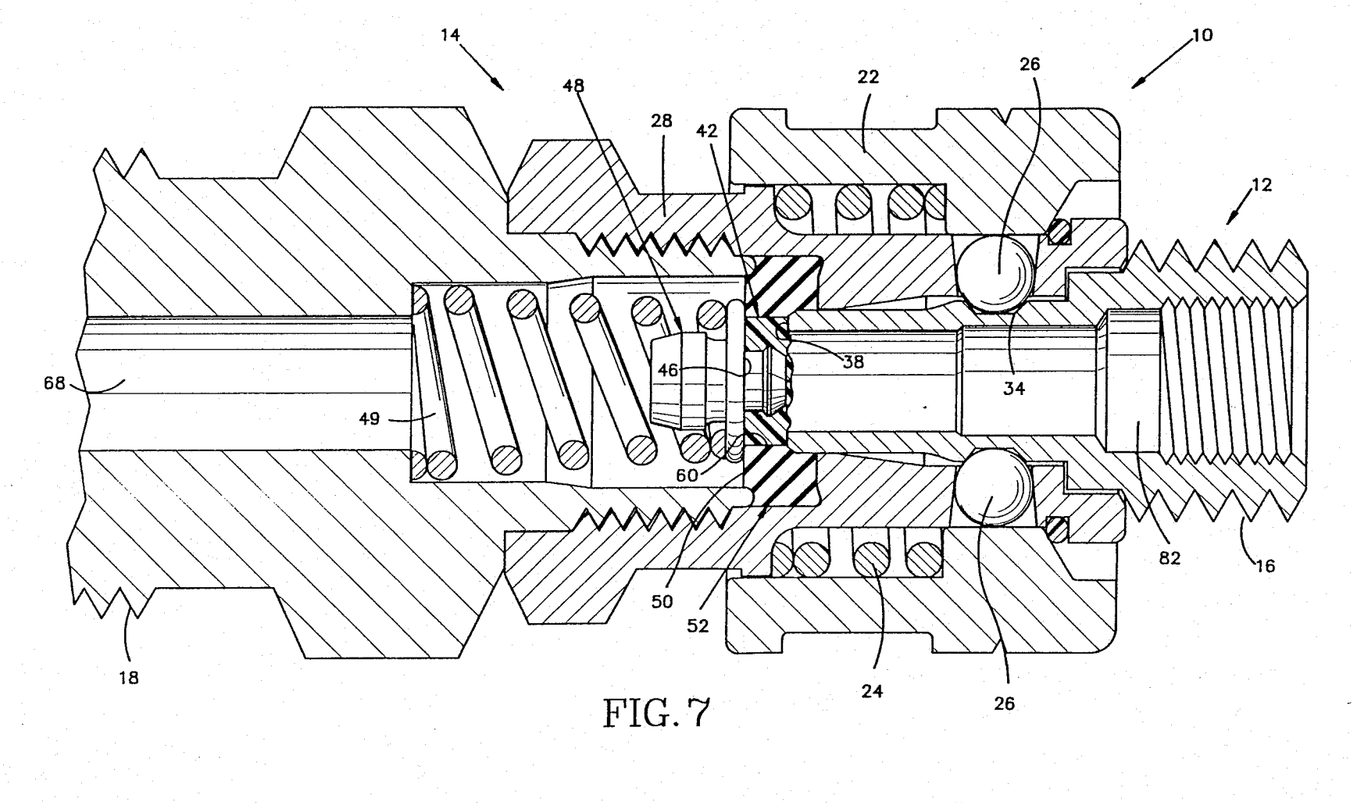
FIG. 7 is a sectional view, generally similar to FIG. 1, illustrating the manner in which the heat fusible actuator member of FIGS. 4–6 is axially compressed upon exposure to excessive heat.

As the actuator member 42 fuses and is compressed, the valve member 48 is moved from the open condition of FIG. 1 to the closed condition of FIG. 7 by the biasing spring 49. Therefore, whenever the coupling 10 is exposed to excessive heat, the valve member 48 closes to block fluid flow through the coupling. To provide for fusing and subsequent compressing of the actuator member 42 when it is exposed to excessive heat, the actuator member is formed of a polymeric material which loses its rigidity and is reduced to a plastic state when it is heated to a temperature in excess of 200° F. It is believed that this feature will be particularly advantageous when the coupling 10 is used in association with flammable fluids.

Prior to being exposed to excessive heat, the actuator member 42 is rigid and transmits force from the end of the plug assembly 12 to the valve member 48 to hold the valve member open against the force of the biasing spring 49. At this time, the actuator member is contained within a cylindrical spatial envelope. The cylindrical spatial envelope containing the actuator member 42 is defined by the cylindrical outer side surface 56 (FIGS. 5 and 6) of the actuator member and by the flat circular end surfaces 40 and 44 (FIGS. 4 and 6) of the actuator member. This spatial envelope is disposed in a coaxial relationship with the valve member 48, seal ring 52 and plug assembly 12. Although the actuator member is disposed within a relatively large cylindrical spatial envelope, the hollow construction of the actuator member and the side openings 70 and 72 enable the actuator member to be formed from a relatively small mass of material which quickly fuses upon being exposed to excessive heat.

When the actuator member 42 is exposed to excessive heat, that is after being heated to a temperature of at least 200° F., the actuator member starts to fuse. As the actuator member begins to fuse or melt, it loses its rigidity. The loss in rigidity enables the force applied against the valve member 48 by the biasing spring 49 to axially crush or compress the actuator member 42 into a relatively small unitary body (FIG. 7). As the actuator member 42 is crushed from the initial configuration of FIG. 1 to the compressed configuration of FIG. 7, the valve member 48 moves from the open condition to the closed condition to block fluid flow through the coupling 10.

The compressed unitary body of the actuator member 42 (FIG. 7) is contained in a relatively small cylindrical spatial envelope which is disposed in a coaxial relationship with the valve member 48, seal ring 52 and plug assembly 12. Thus, the actuator member 42 is axially compressed from the relatively long length of FIG. 1 to the relatively short length of FIG. 7. The compressed actuator member 42 (FIG. 7) is disposed between the flat annular side surface 46 on the valve member 48 and the annular end surface 40 of the plug assembly 12. The radially outer side surface of the compressed actuator member 42 is restrained by the cylindrical inner side surface 60 of the annular seal ring 52. This results in the compressed actuator member 42 occupying a generally cylindrical spatial envelope having an axial extent which is substantially smaller than the original spatial envelope (FIG. 1) occupied by the actuator member. The compressed actuator member 42 will probably have an axial bulge which extends into the plug assembly 12.

The actuator member 42 is mounted on the valve member 48 for movement with the valve member between the open condition of FIGS. 1 and 3 and the closed condition of FIGS. 2 and 7. Thus, the actuator member 42 has an inwardly projecting mounting ring 84 (FIGS. 3, 4 and 5) which snaps onto and is coaxial with a central section 88 of the valve member 48. During assembly of the coupling 10, a circular end opening 90 (FIGS. 3, 4 and 5) on the actuator member 42 is snapped or forced over a large head end portion 94 on the central section 88 of the valve member 48. This results in the actuator member 42 being connected with the valve member 48 for movement therewith.

Although the actuator member 42 can be connected with the valve member 48 by being snapped over the enlarged head end portion 94 of the central projection 88, it is contemplated that the actuator member could be connected with the valve member in other ways if desired. For example, there could be an interference fit between the opening 90 in the valve member and either a smooth or serrated surface on the coaxial central projection 88. It is also contemplated that a relatively small annular flange could be provided at the end of the actuator member 42 adjacent to the valve member to engage the side surface 50 of the seal ring 52 when the valve member 48 is in the closed condition of FIG. 2.

In one specific embodiment of the coupling 10, the actuator member 42 was formed of an acetal plastic, specifically "DELRIN". This specific plastic material fused at a temperature of approximately 350° F. Although for certain uses a fusing temperature of 350° F. with a resulting closing of the valve member 48 may be satisfactory, it is contemplated that the coupling 10 will be used in environments wherein fusing and a resulting closing of the valve member 48 occurs at a temperature of 200° F. to 250° F. When the actuator member 42 is to fuse and the valve member 48 close at a relatively low temperature of 200° F. to 250° F., the actuator member 42 may be formed of a material other than an acetal plastic. For instance, the actuator member may be formed of an acrylic plastic having the required low fusing temperature. Of course, the actuator member 42 could be formed of other known polymeric materials if desired.

In one specific embodiment of the coupling 10, the actuator member 42 had an axial length, prior to compression, of 0.230 inches. This specific actuator member had a cylindrical sidewall with an inside diameter of approximately 0.200 inches and an outside diameter of approximately 0.250 inches for a resulting wall thickness of 0.025 inches. In this specific embodiment of the actuator member 42, the side openings 70 and 72 had a length in a direction parallel to the longitudinal central axis of the actuator member of approximately 0.148 inches and a width transverse to the longitudinal central axis of the actuator member of approximately 0.110 inches. The annular base or portion 88 of the actuator member which snapped over the central portion of the valve member 48, had and axial extent of approximately 0.032 inches and a central opening with a diameter of approximately 0.125 inches.

Due to the relatively thin sidewall of this specific actuator member 42, that is 0.025 inches, the force applied by the biasing spring 49 against the valve member 48 could crush or axially compress the actuator member into a unitary body contained within a relatively small cylindrical spatial envelope having an axial extent of approximately 0.100 inches and an outside diameter of approximately 0.250 inches. Of course, the axial extent of the spatial envelope into which the actuator member 42 is compressed when it fuses will, in part, depend upon the spacing between the end surface 38 on the plug assembly 12 and the side surface 50 of the seal ring 52 (see FIGS. 3 and 7). The compressed actuator member 42 may bulge somewhat into the central passage in the plug assembly 12. However, most of the material of the actuator member 42 will be contained in the space disposed inside the seal ring 52 between the end surface 38 of the plug assembly 12 and the flat annular side surface 46 of the valve member 48.

The foregoing specific dimensions for one embodiment of the actuator member 42 have been set forth herein for purposes of clarity of illustration and not for purposes of limitation of the invention. Thus, it is contemplated that the size of the actuator member 42 will vary depending upon the size of the plug and socket assemblies 12 and 14 with which the actuator member is associated. Of course, other factors, such as the strength of the valve biasing spring 49, will effect the dimensions of the actuator member 42. Similarly, the material which is used in the actuator member 42 may vary depending upon the desired fusing temperature and wear resistance of the actuator member.

Second Embodiment

In the embodiment of the invention illustrated in FIGS. 1 through 7, the actuator member 42 is compressed axially when the actuator member fuses. However, it is contemplated that the actuator member could be compressed radially when the actuator member is exposed to excessive heat and fuses. In the embodiment of the invention shown in FIGS. 8 and 9, the actuator member is constructed in such a manner as to promote radial compression or crushing of the actuator member. Since the embodiment of the invention illustrated in FIGS. 8 and 9 is generally similar to the embodiment of the invention illustrated in FIGS. 1–7, similar numerals will be utilized to designate similar components, the suffix letter "a" being associated with the numerals in FIGS. 8 and 9 to avoid confusion.

An actuator member 42a (FIG. 8) has a thin cylindrical sidewall 56a. A pair of rectangular openings 70a and 72a are formed in the sidewall 56a. A base 84a of the actuator member 42a has a circular opening 90a. The actuator member 42a (FIG. 9) is connected with a valve member 48a by snapping a central projection 88a on the valve member 48a into the opening 90a in the actuator member 42a.

Prior to being exposed to excessive heat and fusing of the actuator member 42a, the actuator member is relatively rigid and an annular end 40a (FIG. 8) of the actuator member abuttingly engages the plug assembly 12The actuator member 42a is rigid and transmits force axially from the plug assembly 12a to the valve member 48a to hold the valve member in the open condition against the influence of a biasing spring 49a. Upon movement of the valve member 48a between its open and closed conditions, the actuator member 42a moves with the valve member 48a and cooperates with the seal ring 52a to guide movement of the valve member.

Figure 8:
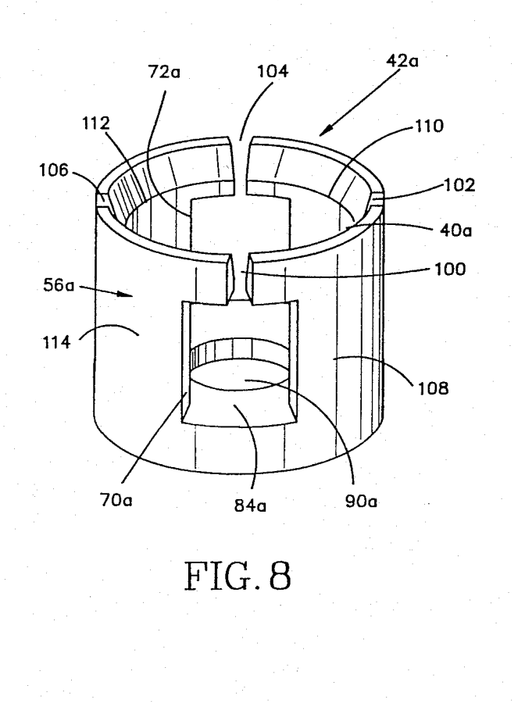
FIG. 8 is a pictorial illustration depicting the construction of a second embodiment of the heat fusible actuator member.
Figure 9:
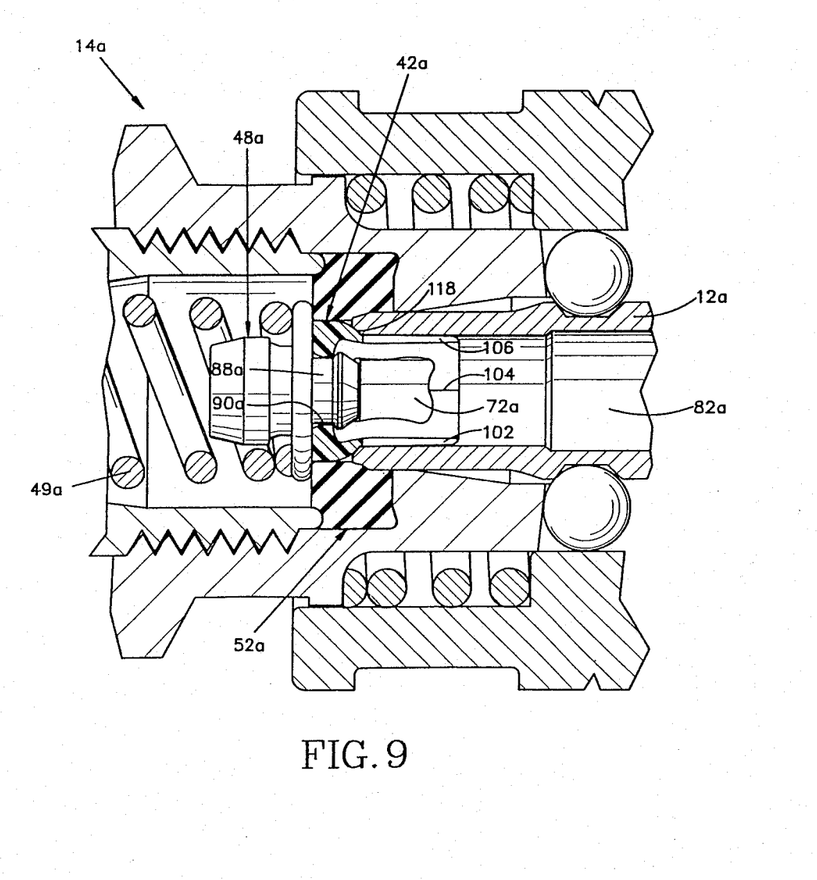
FIG. 9 is a fragmentary sectional view, generally similar to FIG. 7, illustrating the manner in which the heat fusible actuator member of FIG. 8 is radially compressed upon exposure to excessive heat.

To facilitate radial compression of the actuator member 42a, the actuator member is provided with a plurality of axially extending slots 100, 102, 104 and 106 (FIG. 8). Prior to exposure of the actuator member 42a to excessive heat, the actuator member has sufficient rigidity to prevent radial deformation or compressing of the actuator member under the influence of forces transmitted between the plug assembly 12a and valve member 48a. However, when the actuator member 42a is exposed to excessive heat, the actuator member starts to fuse and looses its rigidity.

When the actuator member 42a fuses, axially extending segments 108, 110, 112 and 114 (FIG. 8) of the sidewall 56a are compressed radially inwardly toward each other by the radially and axially inwardly tapered leading end of the plug assembly 12a. This radial deformation of the actuator member 42a closes the slots 100, 102, 104 and 106. As the actuator member 42a is radially compressed into a unitary body, the size of the spatial envelope containing the actuator member decreases. The resulting decrease in the circumference of the cylindrical wall 56a of the actuator member enables it to telescopically move into the plug assembly 12 in the manner illustrated in FIG. 9.

As the fused actuator member 42a is radially compressed under the influence of the force applied by the spring 49a against the valve member 48a, the actuator member is moved axially into a cylindrical portion of a passage 82a in the plug assembly 12a. As the actuator assembly 42a is telescoped into the plug assembly 12a, the valve member 48a moves into sealing engagement with the seal ring 52a. This blocks fluid flow through the plug assembly 12a and socket assembly 14a.

Although the slots 100, 102, 104 and 106 have been shown in FIG. 8 as being unobstructed, it is contemplated that a relatively weak reinforcing member or bar could be provided in each of the slots 100, 102, 104 and 106 to increase the structural strength of the actuator member 42a prior to fusion. Thus, a small web could be provided in each of the slots. The web which would be provided in each of the slots 100, 102, 104 and 106 would be relatively thin and would function to prevent resilient deformation of the actuator member 42a prior to fusion. Upon being exposed to excessive heat, the relatively thin and fragile webs spanning the slots 100, 102, 104 and 106 would quickly loose their structural rigidity and allow the actuator member 42a to be radially compressed in the manner illustrated in FIG. 9. The leading or outer end surface of the plug assembly 12a may be provided with a beveled or frustoconical end surface which tends to cam or force the wall sections 108, 110, 112 and 114 of the actuator member 42a radially inwardly.

Figure 4:
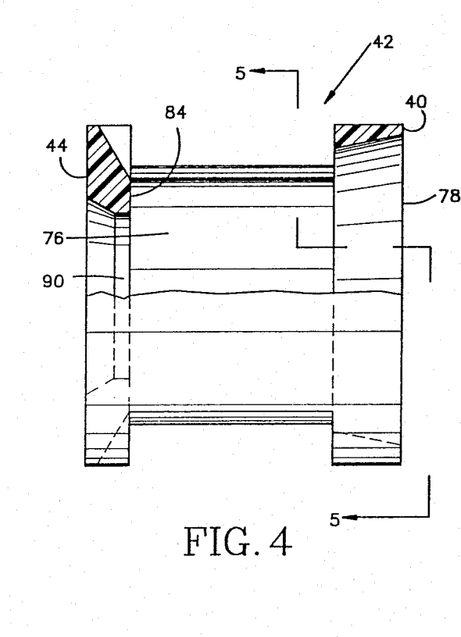
FIG. 4 is an enlarged and partially broken away sectional view of the heat fusible actuator member of FIG. 3.

Although the valve member 48a has been illustrated in FIG. 4 as being mounted in the socket assembly 14a, it is contemplated that the valve member 48a could be mounted in the plug assembly 12a if desired. It should also be understood that the actuator member 42a could be formed of any suitable material having a desired fusion temperature. For example, the actuator member 42a was formed of an acetal plastic having a fusion temperature of approximately 350° F. It is contemplated that other polymeric materials could be utilized if desired.

Conclusion

In view of the foregoing description, it is apparent that the present invention provides a new and improved coupling 10 for use in connecting a pair of conduits in fluid communication. The coupling 10 includes a plug assembly 22 which is adapted to be connected with one of the conduits and a socket assembly 14 which is adapted to be connected with the other conduit. The plug and socket assemblies 12 and 14 are interconnectable to connect the conduits in fluid communication with each other.

The socket assembly 14 includes a valve member 48 which is urged toward a closed condition by a biasing spring 44. A heat fusible actuator member 42 extends axially outwardly from the valve member 48. The actuator member 42 has an outer end portion which is engageable by the plug assembly 12 to transmit force to move the valve member 48 from the closed condition (FIG. 2) to the open condition (FIGS. 1 and 3) as the plug and socket assemblies 12 and 14 are interconnected.

Upon exposure of the coupling 10 to excessive heat, the actuator member 42 fuses and is compressed to release the valve member from movement to the closed condition under the influence of a biasing spring 49 while the plug and socket assemblies remain interconnected. Thus, upon exposure of the coupling 10 to excessive heat, the actuator member 42 is crushed or compressed into a unitary body to reduce its size and allow the valve member 48 to move to the closed condition. In one embodiment of the invention, the actuator member 42 is axially compressed (FIG. 7). In another embodiment of the invention, the actuator member 42a is radially compressed (FIG. 9). Although it is preferred to mount the valve member 48 and actuator member 42 in the socket assembly 14, it is contemplated that the valve member and/or actuator member could be mounted in the plug assembly 12 if desired.

Having described specific preferred embodiments of the invention, the following is claimed:

1. A coupling for use in connecting a pair of conduits in fluid communication, said coupling comprising a plug assembly adapted to be connected with one of the conduits, a socket assembly adapted to be connected with another of the conduits, said plug and socket assemblies being interconnectable to connect the conduits in fluid communication, a first one of said assemblies including a valve member movable along its central axis between a closed condition blocking fluid flow through said first one of said assemblies and an open condition in which said valve member is ineffective to block fluid flow through said first one of said assemblies, spring means for urging said valve member toward the closed condition, a heat fusible actuator member connected to said valve member for movement therewith, said actuator member extending axially outwardly from one end of said valve member and having an axially outer end portion which is engageable with a second one of said assemblies to transmit force from the second one of said assemblies to said valve member to move said valve member from the closed condition to the open condition upon interconnection of said assemblies, said actuator member being fusible upon exposure to excessive heat to release said valve member for movement from the open condition to the closed condition under the influence of said spring means while said assemblies are interconnected.

2. A coupling as set forth in claim 1 wherein said actuator member includes surface means defining a side opening which extends along and is offset to one side of the central axis of the first one of said assemblies and an end opening which extends transversely to and is intersected by the central axis of the first one of said assemblies to enable fluid to flow through said actuator member along a path which extends between said end and side openings when said valve member is in the open condition.

3. A coupling as set forth in claim 1 wherein the first one of said assemblies includes seal means for engaging said valve member when said valve member is in the closed condition, said actuator member having an outer side surface which slides along a surface of said seal means to guide movement of said valve member between the open and closed conditions.

4. A coupling as set forth in claim 1 wherein said valve member is formed of metal having a first melting temperature and said actuator member is formed of a polymeric material having a second melting temperature which is less than one half of the first melting temperature.

5. A coupling as set forth in claim 1 wherein the first one of said assemblies includes annular seal means for sealingly engaging said valve member when said valve member is in the closed condition and for sealingly engaging the second one of said assemblies when said assemblies are interconnected and said valve member is in the open condition, said actuator member being circumscribed by said seal means when said valve member is in the open condition.

6. A coupling as set forth in claim 1 wherein said actuator member has an axially inner end portion which is connected with said valve member, said inner end portion of said actuator member and said valve member being movable together under the influence of said spring means upon fusing of said actuator member and movement of said valve member from the open condition to the closed condition while said assemblies are interconnected.

7. A coupling assembly as set forth in claim 1 wherein said actuator member has an axially inner end portion which engages said valve member, said inner end portion of said actuator member and said valve member being movable together relative to an outer end portion of said actuator member under the influence of said spring means upon fusing of said actuator member and movement of said valve member from the open condition to the closed condition while said assemblies are interconnected.

8. A coupling for use in connecting a pair of conduits in fluid communication, said coupling comprising a plug assembly adapted to be connected with one of the conduits, a socket assembly adapted to be connected with another of the conduits, said plug and socket assemblies being interconnectable to connect the conduits in fluid communication, a first one of said assemblies including a valve member movable between a closed condition blocking fluid flow through said first one of said assemblies and an open condition in which said valve member is ineffective to block fluid flow through said first one of said assemblies, spring means for urging said valve member toward the closed condition, a heat fusible actuator member which fuses when exposed to excessive heat, said actuator member being disposed between said valve member and a second one of said assemblies to transmit force from the second one of said assemblies to said valve member to move said valve member from the closed condition to the open condition upon interconnection of said assemblies, said actuator member having outer side surfaces which define a first spatial envelope which contains said actuator member upon interconnection of said assemblies, said actuator member being fusible and compressible upon exposure to excessive heat to release said valve member for movement from the open condition to the closed condition under the influence of said spring means while said assemblies are interconnected, said valve member and the second one of said assemblies having surface means for compressing said actuator member into a unitary body contained in a second spatial envelope which is smaller than the first spatial envelope upon fusing of said actuator member due to exposure to excessive heat.

9. A coupling as set forth in claim 8 wherein said actuator member is connected to said valve member for movement therewith as said valve member moves between the open and closed conditions.

10. A coupling as set forth in claim 8 wherein said actuator member has a central axis which extends parallel to a path of movement of said valve member between the open and closed conditions, said actuator member extending for a first distance along its central axis prior to fusing of said actuator member due to exposure to excessive heat, said actuator member extending for a second distance along its central axis after fusing and compressing of said actuator member, said second distance being smaller than said first distance.

11. A coupling as set forth in claim 8 wherein said actuator member has an end portion which engages the second one of said assemblies, said end portion of said actuator member has a circular configuration with a first diameter prior to fusing of said actuator member due to exposure to excessive heat, said end portion of said actuator member having a second diameter after fusing and compressing of said actuator member, said second diameter being smaller than said first diameter.

12. A coupling as set forth in claim 8 wherein said actuator member is disposed in abutting engagement with a first surface on said valve member and with a second surface on the second one of said assemblies prior to and after fusing and compressing of said actuator member, said first and second surfaces being spaced apart by a first distance prior to fusing of said actuator member, said first and second surfaces being spaced apart by a second distance after fusing of said actuator member, said first distance being greater than said second distance.

13. A coupling as set forth in claim 8 wherein said actuator member is disposed in abutting engagement with an end portion of the second one of said assemblies prior to fusing of said actuator member due to exposure to excessive heat, said actuator member extending through said end portion of the second one of said assemblies into a telescopic relationship with the second one of said assemblies after fusing and compressing of said actuator member.

14. A coupling as set forth in claim 8 wherein said actuator member has a tubular configuration with a central passage through which fluid flow is conducted prior to fusing of said tubular actuator member due to exposure to excessive heat.

15. A coupling as set forth in claim 14 wherein a first axial end portion of said tubular actuator member is disposed in abutting engagement with said valve member and a second axial end portion of said tubular actuator member is disposed in abutting engagement with the second one of said assemblies prior to fusing of said actuator member, at least one of said end portions of said tubular actuator member having an opening through which fluid flow between said assemblies is conducted.

16. A coupling as set forth in claim 14 wherein the central passage through said tubular actuator member has a first cross sectional area prior to fusing of said actuator member due to exposure to excessive heat, the central passage through said tubular actuator member having a second cross sectional area after fusing and compressing of said tubular actuator member, said second cross sectional area being smaller than said first cross sectional area.

17. A coupling as set forth in claim 14 wherein one of said assemblies includes an annular seal member into which said tubular actuator member extends, said tubular actuator member having an outer side surface which slides along an inner side surface of said seal member upon movement of said valve member between the open and closed conditions.

* * * * *